(12) United States Patent
Fujishiro

(10) Patent No.: US 7,263,110 B2
(45) Date of Patent: Aug. 28, 2007

(54) SYNCHRONIZING CLOCK SIGNALS OF SERVER AND CLIENT DEVICES IN A NETWORK SYSTEM BASED ON POWER SOURCE SYNCHRONOUS PULSE SIGNAL

(75) Inventor: Yoshiya Fujishiro, Kanagawa (JP)

(73) Assignee: D&M Holdings Inc., Kanagawa (JP)

( * ) Notice: Subject to any disclaimer, the term of this patent is extended or adjusted under 35 U.S.C. 154(b) by 901 days.

(21) Appl. No.: 10/658,332

(22) Filed: Sep. 10, 2003

(65) Prior Publication Data

US 2004/0066801 A1  Apr. 8, 2004

(30) Foreign Application Priority Data

Sep. 30, 2002 (JP) .............................. 2002-286982
Jan. 22, 2003 (JP) .............................. 2003-013258

(51) Int. Cl.
*H04J 3/06* (2006.01)
*H04N 7/12* (2006.01)

(52) U.S. Cl. ................................. 370/503; 375/240.28

(58) Field of Classification Search ................ 370/503, 370/518; 375/359
See application file for complete search history.

(56) References Cited

U.S. PATENT DOCUMENTS 4,908,600 A * 3/1990 Martinez ................ 340/538.11
5,787,132 A * 7/1998 Kishigami et al. .......... 375/354
6,747,998 B1 * 6/2004 Enari ......................... 370/516
7,043,313 B1 * 5/2006 Shuttleworth ................ 700/94
2002/0140547 A1 * 10/2002 Litwin et al. .......... 340/310.01

FOREIGN PATENT DOCUMENTS

EP          0 987 894 A2    3/2000

* cited by examiner

*Primary Examiner*—Rafael Perez-Gutierrez
*Assistant Examiner*—Allahyar Kasraian
(74) *Attorney, Agent, or Firm*—Dickstein Shapiro LLP

(57) ABSTRACT

In a network system, clock signals of a server device and a client device are synchronized with each other without having any influence of a change and a delay of the transmission time of data. Therefore, in the network system in which the client device receives and reproduces information transmitted from the server device, the server device counts the number of clock pulses of a server clock signal used to compress and encode information on the basis of a power source synchronous pulse signal synchronized with a power source frequency. The server device outputs information showing the counted clock pulse number and the compressed and encoded information to the client device. The client device counts the number of clock pulses of a client clock signal used to decode and decompress the compressed and encoded information on the basis of the power source synchronous pulse signal synchronized with the power source frequency. The client device conforms the frequency of the client clock signal to the frequency of the server clock signal on the basis of the clock difference between the clock pulse number received from the server device and the counted clock pulse number.

3 Claims, 7 Drawing Sheets

SYNCHRONIZING CLOCK SIGNALS OF SERVER AND CLIENT DEVICES IN A NETWORK SYSTEM BASED ON POWER SOURCE SYNCHRONOUS PULSE SIGNAL

BACKGROUND OF THE INVENTION

1. Field of the Invention

The present invention relates to a network system for transmitting audio information, video information, etc.

2. Description of the Related Arts

The case of possessing plural personal computers (the personal computer hereinafter is called "PC") in one household, and constructing and utilizing a PC network within a home is increasing. Further, a utilizing method for accumulating audio information, video information, etc. in a server device by using the PC network within the home, and reproducing the audio information, the video information, etc. by a client device is considered.

As one example of the utilizing method of the network within the home, there is a method for utilizing Transmission Control Protocol/Internet Protocol (hereinafter called "TCP/IP") as a communication protocol of the network, and compressing and transmitting the audio information, the video information, etc. in a Moving Picture Experts Group-2 (hereinafter called "MPEG-2") system. In this utilizing method, there are two types as to which has the leadership of data transmission between the server device and the client device.

One type is called a pull type. In the pull type, the client device has the leadership of the data transmission. When the client device requires data, the client device requests the server device to transmit and output the data. This pull type is used when a compression file, etc. already stored to the server device are read by the client device and are reproduced, etc.

The other type is called a push type. In the push type, the server device has the leadership of the data transmission, and sends data to the client device. This push type is used when the server device compresses and stores the audio information, the video information, etc., and transmits such information to the client device, and the client device reproduces the transmitted audio information, video information, etc.

In the network system of the push type, it is important to take synchronization of the server device and the client device. When a clock used to encode data in an encoder of the server device and a clock used to decode data in a decoder of the client device are not synchronized with each other, an overflow or an underflow is caused in a buffer memory built in the decoder of the client device.

When data transmitted by a communication line of the network are e.g., data of the MPEG-2 system, time information called a Program Clock Reference (hereinafter called "PCR") is included within the transmitted data. The decoder of the client device takes the synchronization with the encoder of the server device by using the PCR.

However, when the data are transmitted through the communication line, it must cope with a change and a delay of transmission time. There is a case in which other electronic devices are also connected to the network in addition to the server device and the client device and are used. The change and the delay of the transmission time are also caused when such plural electronic devices are connected and utilized.

There are "a clock change compensating method and a real time audio/visual system" disclosed in Japanese patent publication No. 2000-92130 A (corresponding patent EP 0987894 A2) literature 1 as a method for coping with the change and the delay of the transmission time of data. In this method and this system, the storing amount of a buffer memory of the client device is detected and the server device and the client device are synchronized with each other.

The data transmission of a constant bit rate in the network is set to a premise in the invention disclosed in the above literature 1, but this disclosed invention cannot cope with the data transmission of a variable bit rate. This is because the data amount inputted to the buffer memory is changed in the data transmission at the variable bit rate so that no correcting amount can be calculated by detecting only the data amount of the buffer memory.

An object of the invention is to take the synchronization of a server clock signal of the server device and a client clock signal of the client device without having any influence of the change and the delay of the transmission time of data even when the data of audio information or video information, etc. are transmitted at the variable bit rate in the network system of the push type.

SUMMARY OF THE INVENTION

The invention of the first aspect resides in a network system comprising a server device for transmitting audio information or video information and a client device for receiving the audio information or the video information transmitted from the server device, wherein the server device counts the number of clock pulses of a server clock signal used to encode the audio information or the video information on the basis of a power source synchronous pulse signal synchronized with the power source frequency of electric power supplied to the server device, and outputs information showing the counted clock pulse number to the client device; and the client device receives the information showing the clock pulse number and transmitted from the server device, and counts the number of clock pulses of a client clock signal used to decode the audio information or the video information on the basis of a power source synchronous pulse signal synchronized with the power source frequency of electric power supplied to the client device, and the frequency of the client clock signal is conformed to the frequency of the server clock signal on the basis of the difference between the clock pulse number received from the server device and the counted clock pulse number.

The invention of the second aspect resides in a network system comprising a server device for transmitting audio information or video information and a client device for receiving the audio information or the video information transmitted from the server device, wherein the server device has server clock signal generating means for generating a server clock signal, encoding means for encoding the audio information or the video information on the basis of the server clock signal, server binarizing means for generating a power source synchronous pulse signal synchronized with the power source frequency of electric power supplied to the server device, server clock counting means for counting the number of clock pulses of the server clock signal every integer times of one period of the power source synchronous pulse signal outputted by the server binarizing means, and transmitting means for outputting the audio information or the video information encoded by the encoding means and information showing the clock pulse number counted by the server clock counting means; and the client device has receiving means for receiving the audio information or the video information transmitted from the server device and the information showing the clock pulse number, client clock generating means for generating a client clock signal, decoding means for decoding the audio information or the video information received by the receiving means on the basis of the client clock signal, client binarizing means for generating a power source synchronous pulse signal synchronized with the power source frequency of electric power supplied to the client device, client clock counting means for counting the number of clock pulses of the client clock signal every integer times of one period of the power source synchronous pulse signal outputted by the client binarizing means, and clock difference calculating means for calculating the difference between the clock pulse number received from the server device and the clock pulse number counted by the client clock counting means; and the client clock generating means conforms the frequency of the client clock signal to the frequency of the server clock signal on the basis of the difference in the clock pulse number calculated by the clock difference calculating means.

The invention of the third aspect resides in a network system comprising a server device for transmitting audio information or video information and a client device for receiving the audio information or the video information transmitted from the server device, wherein the server device has server clock signal generating means for generating a server clock signal, encoding means for encoding the audio information or the video information on the basis of the server clock signal, server binarizing means for generating a power source synchronous pulse signal synchronized with the power source frequency of electric power supplied to the server device, server clock counting means for counting the number of clock pulses of the server clock signal every integer times of one period of the power source synchronous pulse signal outputted by the server binarizing means, and transmitting means for outputting the audio information or the video information encoded by the encoding means and information showing the clock pulse number counted by the server clock counting means; and the client device has receiving means for receiving the audio information or the video information transmitted from the server device and the information showing the clock pulse number, decoding means having a buffer for storing the audio information or the video information received by the receiving means, and reading the audio information or the video information stored to this buffer, and decoding the read information on the basis of a client clock signal, client binarizing means for generating a power source synchronous pulse signal synchronized with the power source frequency of electric power supplied to the client device, client clock counting means for counting the number of clock pulses of the client clock signal every integer times of one period of the power source synchronous pulse signal outputted by the client binarizing means, clock counting value correcting means for correcting the clock pulse number counted by the client clock counting means on the basis of the amount of data accumulated in the buffer, clock difference calculating means for calculating the difference between the clock pulse number received by the receiving means and the clock pulse number corrected by the clock counting value correcting means, and client clock signal generating means for outputting the client clock signal conformed to the frequency of the server clock signal to the decoding means on the basis of the difference in the clock pulse number calculated by the clock difference calculating means.

In accordance with the network system of the invention, the server clock signal of the server device and the client clock signal of the client device can be also synchronized with each other without having any influence of the change and the delay of the transmission time of data on the communication line in the network system of the push type when the audio information or the video information, etc. are transmitted at the variable bit rate.

DESCRIPTION OF PREFERRED EMBODIMENTS

Figure 1:
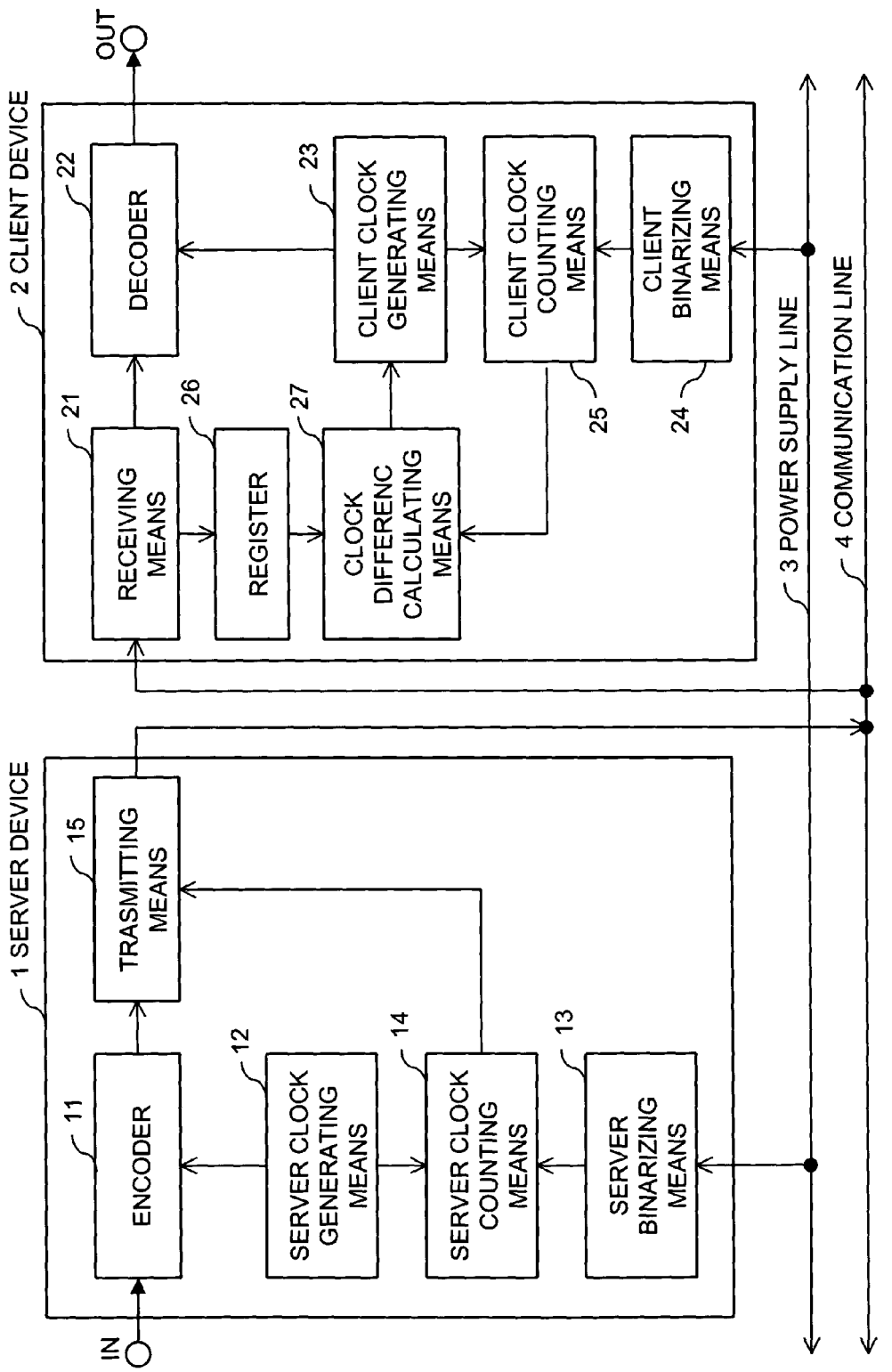
FIG. 1 is a block diagram showing the construction of a first embodiment of a network system of the invention.

FIG. 1 is a block diagram showing the construction of a first embodiment of a network system of the invention.

A server device 1 encodes and compresses audio information or video information inputted from an input terminal IN, and transmits the compressed information to a client device 2 through a communication line 4. The client device 2 receives the audio information or the video information from the server device 1, and decodes and decompresses the audio information or the video information, and outputs the decompressed information to an output terminal OUT. A power supply line 3 supplies electric power to the server device 1 and the client device 2. The communication line 4 is connected to the server device 1 and the client device 2, and transmits the audio information or the video information, etc. The server device 1 and the client device 2 are operated as the network system of the push type.

The server device 1 has an encoder 11, a server clock generating means 12, a server binarizing means 13, a server clock counting means 14 and a transmitting means 15. The encoder 11 encodes and compresses the audio information or the video information inputted from the input terminal IN. The server clock generating means 12 outputs a server clock signal to the encoder 11 and the server clock counting means 14. The server binarizing means 13 binarizes the waveform of an alternating voltage inputted from the power supply line 3, and generates a digital signal (power source synchronous pulse signal). The server clock counting means 14 counts the number of clock pulses of the server clock signal outputted from the server clock generating means 12 every integer times of one period of the digital signal generated in the server binarizing means 13, and outputs information showing the counted clock pulse number of the server clock signal to the transmitting means 15. The transmitting means 15 outputs the audio information or the video information compressed and encoded by the encoder 11 and information showing the clock pulse number counted by the server clock counting means 14 to the client device 2 through the communication line 4.

The client device 2 has a receiving means 21, a decoder 22, a client clock generating means 23, a client binarizing means 24, a client clock counting means 25, a register 26 and a clock difference calculating means 27. The receiving means 21 receives the audio information or the video information transmitted from the server device 1 through the communication line 4 and the information showing the clock pulse number. The receiving means 21 then outputs the audio information or the video information to the decoder 22, and also outputs the information showing the clock pulse number to the register 26. The decoder 22 decodes and decompresses the inputted audio information or video information, and outputs the decompressed information from the output terminal OUT. The client clock generating means 23 generates a client clock signal, and outputs the client clock signal to the decoder 22 and the client clock counting means 25. The client binarizing means 24 binarizes the waveform of the alternating voltage inputted from the power supply line 3, and generates a digital signal (power source synchronous pulse signal).

The client clock counting means 25 counts the number of clock pulses of the client clock signal outputted from the client clock generating means 23 every integer times of one period of the digital signal generated in the client binarizing means 24. The register 26 stores the clock pulse number of the information showing the clock pulse number received by the receiving means 21. The clock difference calculating means 27 calculates the difference between the clock pulse number of the server device 1 stored in the register 26 and the clock pulse number of the client device 2 counted by the client clock counting means 25, and outputs the calculated difference to the client clock generating means 23. The client clock generating means 23 changes the frequency of the client clock signal so as to conform the frequency of the client clock signal of the client device 2 to the frequency of the server clock signal of the server device 1 on the basis of the difference in the clock pulse number calculated by the clock difference calculating means 27.

In this embodiment, the encoder 11 encodes and compresses the audio information or the video information, but may also encode the audio information or the video information without the compression. Further, in this embodiment, the decoder 22 decodes and the compressed and encoded audio information or video information, but may also decode the encoded audio information or video information without the compression.

An operation for synchronizing the server clock signal of the server device 1 and the client clock signal of the client device 2 will be explained.

First, the server binarizing means 13 and the client binarizing means 24 will be explained. Since the server binarizing means 13 and the client binarizing means 24 perform the same operation, the server binarizing means 13 and the client binarizing means 24 are explained as binarizing means 13, 24. The binarizing means 13, 24 respectively generate a power source synchronous pulse signal on the basis of the waveform of the alternating voltage supplied from the power supply line 3 connected to the server device 1 and the client device 2.

Figure 2:
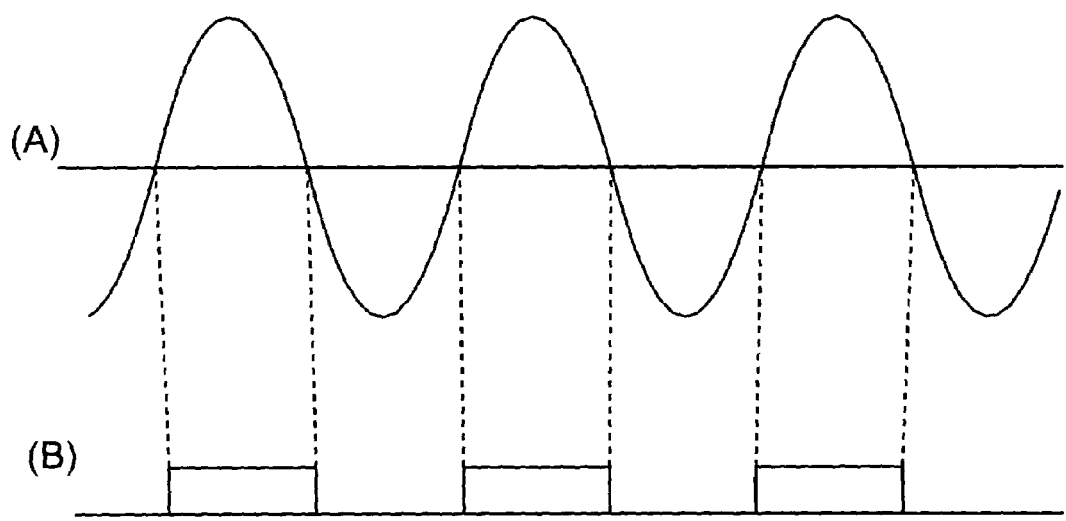
FIG. 2 is a view for explaining the binarization of binarizing means 13, 24 in the network system of the first embodiment of the invention.

FIG. 2 is a view for explaining the binarization of the binarizing means 13, 24 in the network system of the first embodiment of the invention.

The binarizing means 13, 24 obtain the power source synchronous pulse signal of FIG. 2(B) by performing half-wave rectification and limiter processing with respect to the waveform of the alternating voltage shown in FIG. 2(A).

Next, the server clock counting means 14 and the client clock counting means 25 will be explained. Since the server clock counting means 14 and the client clock counting means 25 perform the same operation, the server clock counting means 14 and the client clock counting means 25 are explained as clock counting means 14, 25. Further, since the server clock generating means 12 and the client clock generating means 23 perform the same operation, the server clock generating means 12 and the client clock generating means 23 are explained as clock generating means 12, 23.

Figure 3:
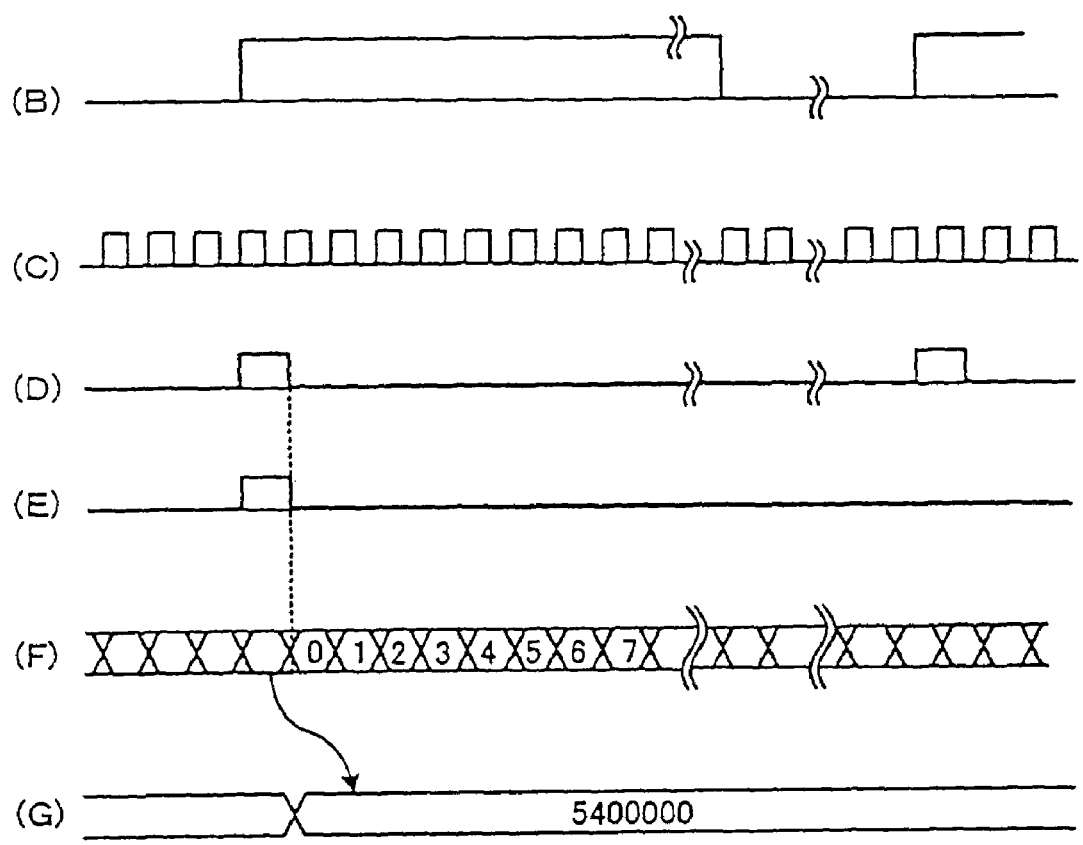
FIG. 3 is a view for explaining clock counting of clock counting means 14, 25 in the network system of the first embodiment of the invention.

FIG. 3 is a view for explaining clock counting of the clock counting means 14, 25 in the network system of the first embodiment of the invention.

The clock counting means 14, 25 sample the power source synchronous pulse signal (B) generated in the binarizing means 13, 24 by a clock signal (C) outputted from the clock generating means 12, 23, and obtains a rise signal (D) showing a rise position of the power source synchronous pulse signal (B). In this embodiment, the rise position of the power source synchronous pulse signal (B) is detected by using the rise signal (D), and a reset signal (E) is obtained every 10 cycles of the power source synchronous pulse signal (B). A signal (F) is obtained by counting the clock pulse number of the clock signal (C) between two reset signals (E), and a counting value signal (G) showing the clock pulse number of the counting signal (F) is outputted.

For example, if the frequency of the clock signal is 27 MHz and the frequency of the alternating power of the power supply line 3 is 50 Hz, the outputs (counting value signals) of the clock counting means 14, 25 become 5,400,000. Here, since an error $\alpha$ is caused with respect to the frequency of the clock signal, the above outputs become 5,400,000±$\alpha$ if this error is considered.

The server device 1 transmits the counting value signal (G) showing the clock pulse number counted by the server clock counting means 14 to the client device 2 through the communication line 4. In this embodiment, since the counting period of one clock pulse number is a period (200 msec) of 10 periods of the frequency of the alternating power, the counting value signal (G) is transmitted from the server device 1 to the client device 2 every 200 msec.

When the receiving means 21 receives the counting value signal (G) showing the clock pulse number from the server device 1, the client device 2 stores the clock pulse number in the register 26. The clock difference calculating means 27 reads the clock pulse number stored in the register 26 and the clock pulse number counted by the client clock counting means 25, and calculates the difference between these clock pulse numbers. For example, if the clock pulse number stored in the register 26 is 5,400,221 and the clock pulse number counted by the client clock counting means 25 is 5,400,032, the difference between these clock pulse numbers becomes 5,400,221−5,400,032=189.

The client clock generating means 23 changes the frequency of the client clock signal on the basis of the difference in the clock pulse number calculated by the clock difference calculating means 27.

Figure 4:
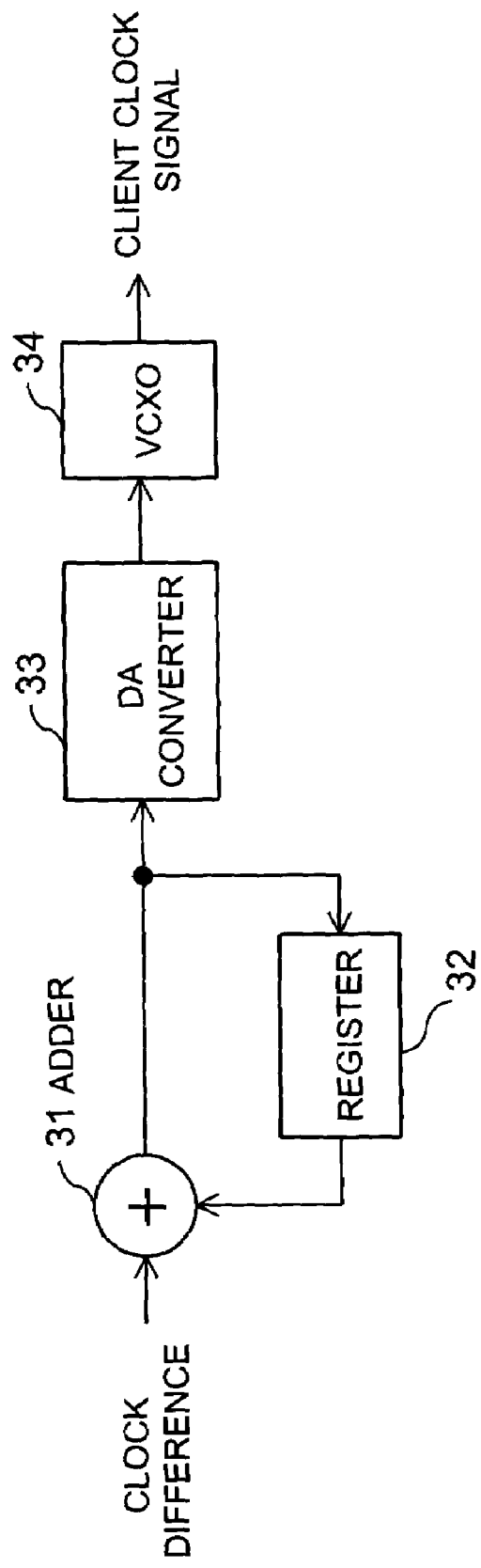
FIG. 4 is a block diagram showing the construction of a client clock generating means of a client device in the network system of the first embodiment of the invention.

FIG. 4 is a block diagram showing the construction of the client clock generating means of the client device in the network system of the first embodiment of the invention.

In FIG. 4, the client clock generating means 23 has an adder 31, a register 32, a Digital Analog (hereinafter called "DA") converter 33, and a Voltage Controlled Crystal Oscillator (hereinafter called "VCXO") 34.

The difference in the clock pulse number outputted from the clock difference calculating means 27 is inputted to the adder 31. The register 32 stores a newest value (control value) outputted from the adder 31. The adder 31 adds the control value stored in the register 32 to the difference in the clock pulse number outputted from the clock difference calculating means 27, and outputs the added value to the DA converter 33 and the register 32.

The control value (digital signal) outputted from the adder 31 is converted to an analog signal (voltage) by the DA converter 33. The analog signal outputted from the DA converter 33 is inputted to the VCXO 34 as a control voltage. The VCXO 34 changes the frequency of the analog signal in accordance with the control voltage, and outputs the client clock signal.

For example, when the network system of this embodiment is used in a home network system constructed by the server device and the client device connected to the same communication line and the same power supply line within a home, the server device generates the server clock signal on the basis of a power source frequency obtained from the power supply line. The client device generates the client clock signal synchronized with the server clock signal on the basis of the power source frequency obtained from the power supply line, and decodes audio information or video information on the basis of this client clock signal. Therefore, the frequency of the client clock signal of the client device can be also synchronized with the frequency of the server clock signal of the server device in the data transmission of a variable bit rate without having any influence of a change and a delay of the transmission time of data caused on the communication line.

A second embodiment of the invention will be explained.

Figure 5:
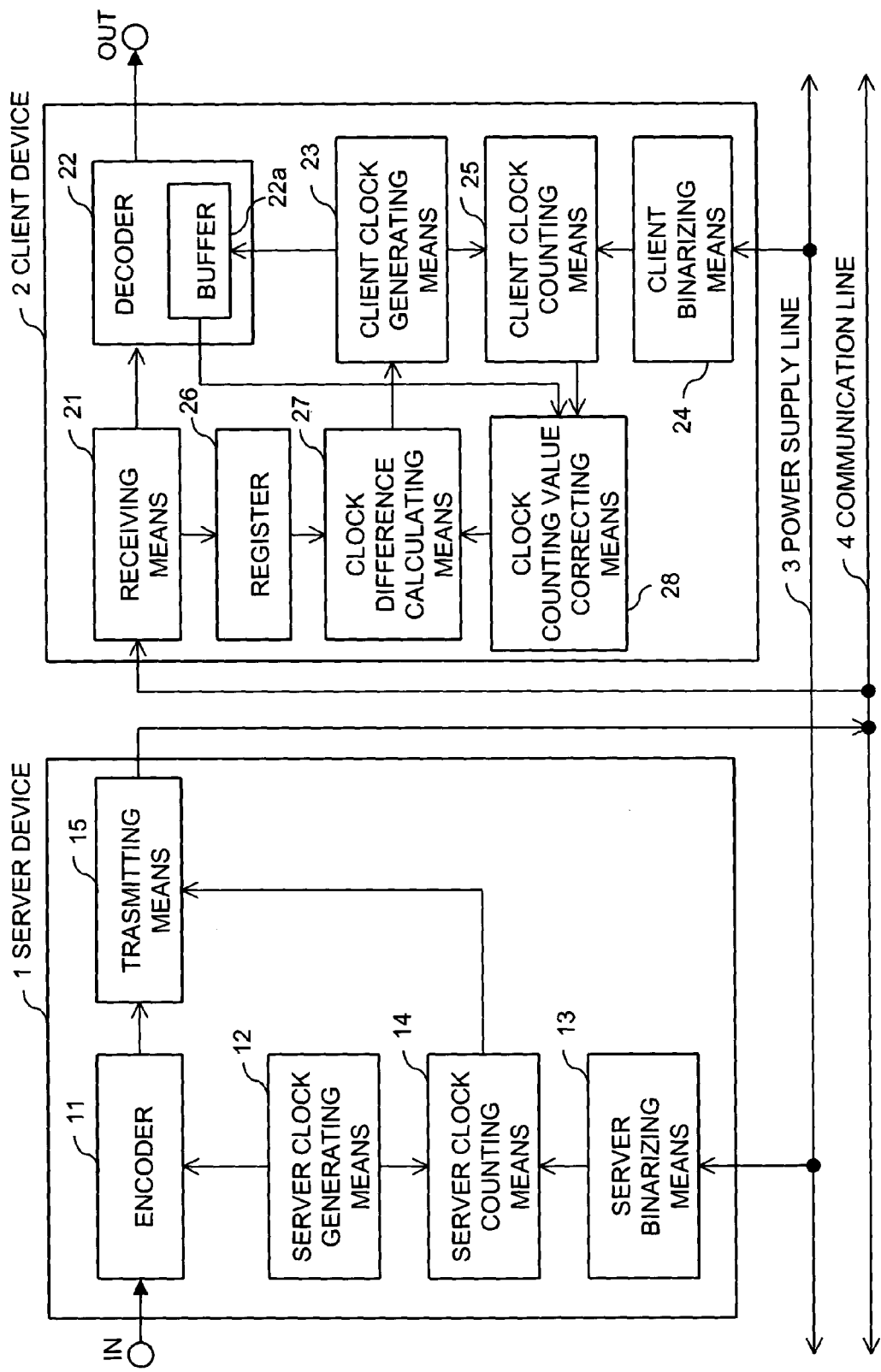
FIG. 5 is a block diagram showing the construction of a second embodiment of the network system of the invention.

FIG. 5 is a block diagram showing the construction of the second embodiment of the network system of the invention.

A server device 1 encodes and compresses audio information or video information inputted from an input terminal IN, and transmits the compressed information to a client device 2 through a communication line 4. The client device 2 receives the audio information or the video information from the server device 1, and decodes and decompresses the audio information or the video information, and outputs the decompressed information to an output terminal OUT. A power supply line 3 supplies electric power to the server device 1 and the client device 2. The communication line 4 is connected to the server device 1 and the client device 2, and transmits the audio information or the video information, etc. The server device 1 and the client device 2 are operated as the network system of the push type.

The server device 1 has an encoder 11, a server clock generating means 12, a server binarizing means 13, a server clock counting means 14 and a transmitting means 15. Since the server device 1 of this embodiment is the same as the server device 1 in the above-mentioned first embodiment, its detailed explanation is omitted.

The client device 2 has a receiving means 21, a decoder 22, a client clock generating means 23, a client binarizing means 24, a client clock counting means 25, a register 26, a clock difference calculating means 27 and a clock counting value correcting means 28. Since the client binarizing means 24, the client clock counting means 25 and the register 26 of this embodiment are the same as the client binarizing means 24, the client clock counting means 25 and the register 26 of the client device 2 in the above-mentioned first embodiment, their detailed explanations are omitted.

In FIG. 5, the decoder 22 has a buffer 22a for temporarily accumulating the audio information or the video information received by the receiving means 21. The decoder 22 reads, decodes and decompresses the compressed and encoded audio information or video information from the buffer 22a, and outputs the decompressed information to an output terminal OUT. The clock counting value correcting means 28 corrects and outputs the counting value of the clock pulse number of the client clock signal counted by the client clock counting means 25 in accordance with the amount of data accumulated in the buffer 22a. The clock difference calculating means 27 calculates the difference between the clock pulse number of the server device stored in the register 26 and the clock pulse number corrected by the clock counting value correcting means 28, and outputs the calculated difference to the client clock generating means 23.

In this embodiment, the encoder 11 encodes and compresses the audio information or the video information, but may also encode the audio information or the video information without the compression. Further, in this embodiment, the decoder 22 decodes and decompresses the compressed and encoded audio information or video information, but may also decode the encoded audio information or video information without the compression.

An operation for synchronizing the server clock signal of the server device 1 and the client clock signal of the client device 2 will be explained.

When the server clock signal of the server device 1 and the client clock signal of the client device 2 are synchronized with each other, the average amount of the data amount accumulated in the buffer 22a becomes approximately constant, but there are cases in which the average amount of its data amount is extremely smaller and greater than the data amount of ½ of the accumulable data amount (data accumulating amount) of the buffer 22a.

When the average amount of the data amount accumulated in the buffer 22a is smaller than the data amount of ½ of the data accumulating amount of the buffer 22a at the time point of the synchronization of the server clock signal and the client clock signal, there is a possibility that the buffer 22a causes an underflow by the delay of data transmission, etc. in the communication line 4. Further, when the average amount of the data amount accumulated in the buffer 22a is greater than the data amount of ½ of the data accumulating amount of the buffer 22a and a large amount of data is transmitted from the server device 1 (when a data transfer rate is raised), there is a possibility that the buffer 22a causes an overflow.

While information showing the clock pulse number is transmitted from the server device 1, the clock counting value correcting means 28 corrects the counting value of the clock pulse number counted by the client clock counting means 25 on the basis of the average amount of the data amount accumulated in the buffer 22a to avoid such underflow and overflow.

FIG. 6 is a view for explaining a data accumulating state of the buffer of the decoder of the client device in the network system of the second embodiment of the invention.

In FIG. 6, a square shape shows the accumulable data amount (data accumulating amount) of the buffer 22a of the decoder 22, and an oblique line portion shows the average amount of the accumulated data amount. An upper side threshold value Uth is set on the side (the upper side in FIG. 6) of the data amount greater than ½ of the data accumulating amount, and a lower side threshold value Dth is set on the side (the lower side in FIG. 6) of the data amount smaller than ½ of the data accumulating amount.

If the average amount of the data amount accumulated in the buffer 22a is greater than the upper side threshold value Uth, the clock counting value correcting means 28 sets the correcting value=+5. In contrast to this, if the average amount of the data amount accumulated in the buffer 22a is smaller than the lower side threshold value Dth, the clock counting value correcting means 28 sets the correcting value=−5.

Figure 6A:
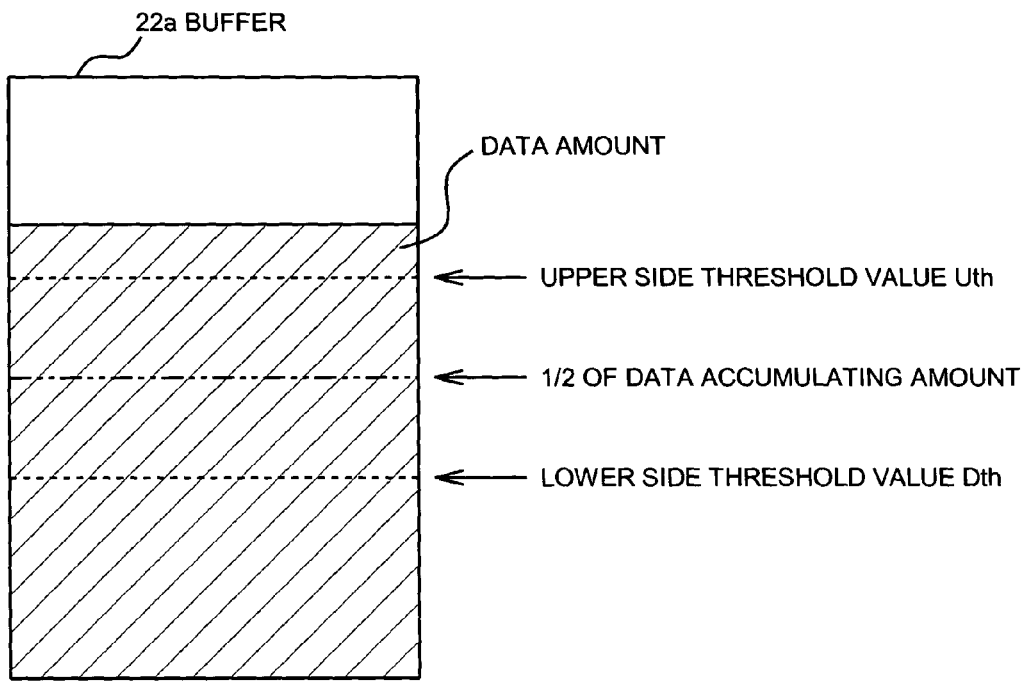
FIG. 6 is a view for explaining a data accumulating state of a buffer of a decoder of the client device in the network system of the second embodiment of the invention.

In FIG. 6A, when the server clock signal of the server device 1 and the client clock signal of the client device 2 are synchronized, there is a case in which the average amount of the data amount accumulated in the buffer 22a is greater than the upper side threshold value Uth. When a large amount of data is transmitted from the server device 1 at the time of this state, there is a case in which the buffer 22a instantaneously causes an overflow. The clock counting value correcting means 28 adds the correcting value (e.g., 5) to the counting value (e.g., 5,400,037) counted by the client clock counting means 25 to avoid this overflow, and outputs this added value (e.g., 5,400,042) to the clock difference detecting means 27.

Figure 6B:
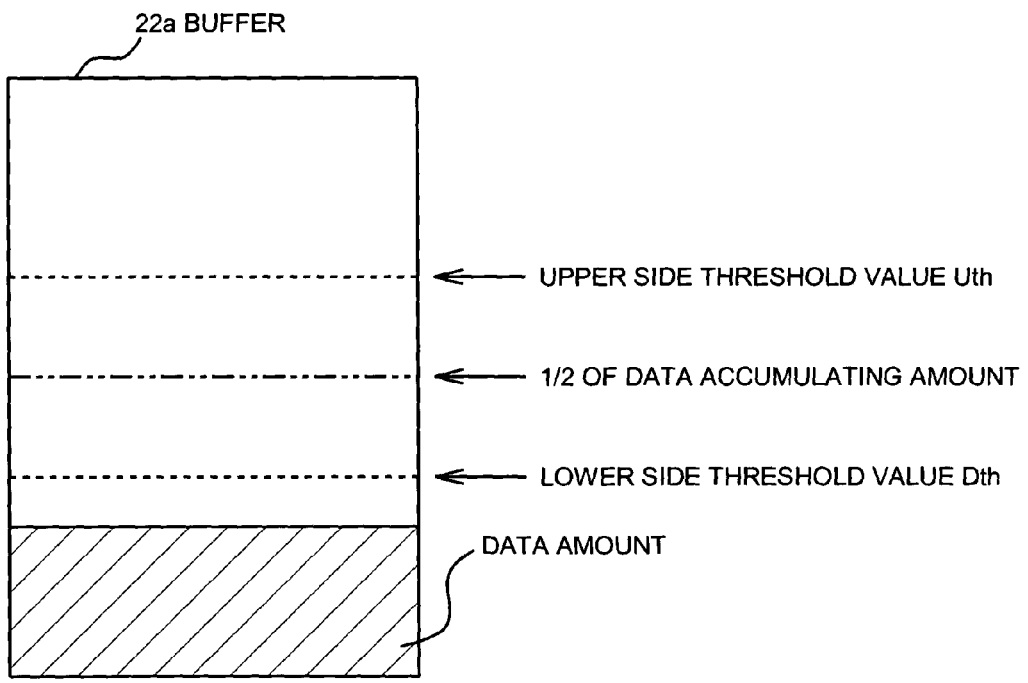

Further, in FIG. 6B, when the server clock signal of the server device 1 and the client clock signal of the client device 2 are synchronized, there is a case in which the average amount of the data amount accumulated in the buffer 22a is smaller than the lower side threshold value Dth. When the data amount inputted to the client device 2 is reduced by causes such as a delay of the data transmission of the communication line 4, etc. at the time of this state, there is a case in which the buffer 22a instantaneously causes an underflow. The clock counting value correcting means 28 subtracts the correcting value (e.g., 5) from the counting value (e.g., 5,400,037) counted by the client clock counting means 25 to avoid this underflow, and outputs this subtracted value (e.g., 5,400,032) to the clock difference detecting means 27.

Thus, when the average amount of the data amount accumulated in the buffer 22a is greater than the upper side threshold value Uth, or when the average amount of the data amount accumulated in the buffer 22b is smaller than the lower side threshold value Dth, the difference in the clock pulse number of the register 26 is also increased when the difference in the clock pulse number of the register 26 is calculated in the clock difference calculating means 27 at the subsequent stage. When the client clock generating means 23 generates the client clock signal on the basis of this difference, the frequency of the client clock signal is synchronized with the frequency of the server clock signal in the data amount in which the average amount of the data amount accumulated in the buffer 22a is about ½ of the data accumulating amount of the buffer 22a. Accordingly, the overflow or the underflow is not easily caused in the buffer 22a.

The clock difference calculating means 27 reads the clock pulse number stored in the register 26 and the clock pulse number corrected by the clock counting value correcting means 28, and calculates the difference between these clock pulse numbers. For example, if the clock pulse number stored in the register 26 is 5,400,221 and the clock pulse number corrected by the clock counting value correcting means 28 is 5,400,032, the difference between these clock pulse numbers becomes 5,400,221−5,400,032=189.

Figure 7:
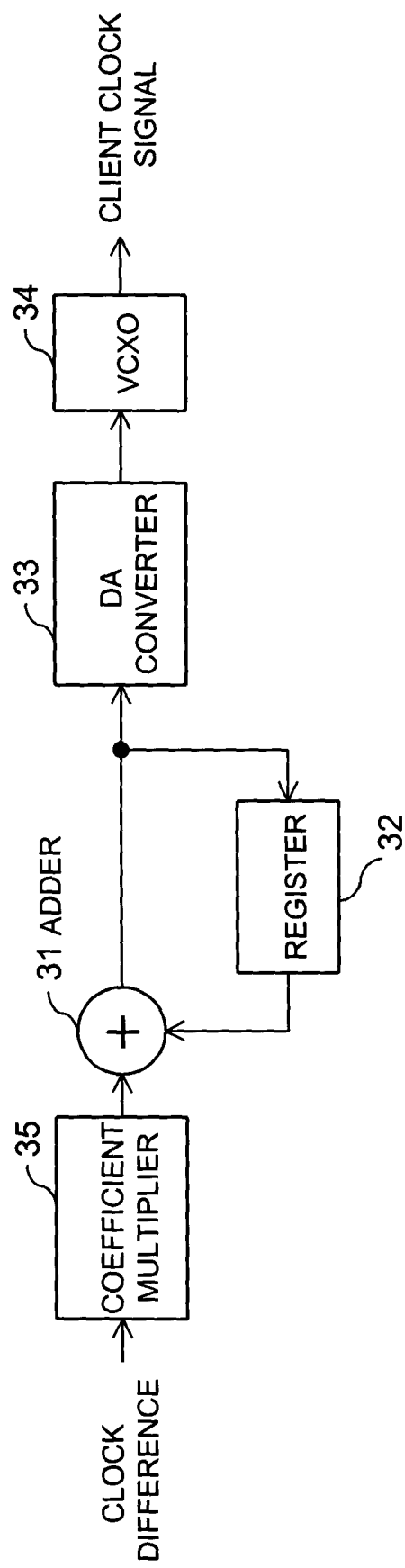
FIG. 7 is a block diagram showing the construction of a client clock generating means of the client device in the network system of the second embodiment of the invention.

FIG. 7 is a block diagram showing the construction of the client clock generating means of the client device in the network system of the second embodiment of the invention.

The client clock generating means 23 changes the frequency of the client clock signal by the difference in the clock pulse number outputted from the clock difference calculating means 27. The client clock generating means 23 has a coefficient multiplier 35 for multiplying the difference in the clock pulse number outputted from the clock difference calculating means 27 by a counting number, an adder 31 for adding a value stored in the register 32 to a value outputted from the coefficient multiplier 35, the register 32 for storing a newest value outputted from the adder 31, a DA converter 33 for converting a digital signal outputted from the adder 31 to an analog signal (voltage), and a VCXO 34 for oscillating the client clock signal of a frequency based on the analog signal outputted from the DA converter 33.

The coefficient multiplier 35 multiplies the difference in the clock pulse number outputted from the clock difference calculating means 27 by the counting number and corrects this difference so as to set the digital signal outputted from the adder 31 at the subsequent stage to the value corresponding to the bit length of the DA converter 33. For example, when the DA converter 33 of a 12-bit length is used and VCXO of control voltage 2.5 V is set and oscillating frequency is 27 MHz ±2700 Hz and 4.0 V is used in the client clock generating means 23, the coefficient becomes 3.795.

Concretely, the VCXO 34 oscillates the signal of a central frequency of 2.7 MHz when central control voltage is 2.5 V, and the frequency can be changed by ±2700 Hz in a range of ±2.0 V from the central control voltage. Namely, in the case of 0.5 V in the control voltage, the signal of a frequency of 27 MHz −2700 Hz is outputted. In the case of 4.5 V in the control voltage, the signal of a frequency of 27 MHz +2700 Hz is outputted.

Since the control voltage is changed from 0.5 V to 4.5 V in the VCXO 34, the DA converter 33 of the 12-bit length (4096 gradations of 0 to 4095) is used. In the DA converter 33 of the 12-bit length, the gradation corresponding to 1 Hz becomes 4096/5400=about 0.759 (/Hz).

The difference in the clock pulse number outputted from the clock difference calculating means 27 becomes a value every 10 periods at a power source frequency of 50 Hz. The actual difference in the clock pulse number per one second becomes five times the difference in the clock pulse number outputted from the clock difference calculating means 27. If the difference in the clock pulse number from the clock difference calculating means 27 is set to A, the actual difference in the clock pulse number per one second becomes A×5 Hz. Namely, the coefficient for correcting this difference in the clock pulse number becomes A(Hz)×5× 0.759 (/Hz)=3.759×A.

Accordingly, the coefficient multiplier 35 multiplies the difference in the clock pulse number outputted from the clock difference calculating means 27 by the coefficient 3.795 and corrects this difference. For example, when the difference in the clock pulse number outputted from the clock difference calculating means 27 is 189, the corrected difference becomes 189×3.795=717.255.

A signal outputted from the coefficient multiplier 35 is inputted to the adder 31 and is added to the value stored in the register 32, and is outputted to the DA converter 33. For example, when the value stored in the register 32 is 2169, 2169+717.255=2886.255 is obtained. Since the value inputted to the DA converter 33 is an integer value, 2886 is obtained. This value is inputted to the DA converter 33 and is stored in the register 32.

The DA converter 33 outputs the voltage corresponding to the value inputted from the adder 31 to the VCXO 34. The VCXO 34 oscillates the signal of a frequency according to the voltage value inputted from the DA converter 33, and outputs this signal to the decoder 22 as a client clock signal.

Thus, the client clock generating means 23 outputs the client clock signal synchronized with the frequency of the server clock signal of the server device 1. The decoder 22 decodes and decompresses the audio information or the video information received from the server device 1 by the receiving means 21 on the basis of this client clock signal, and outputs the decompressed information.

For example, when the network system of this embodiment is used in a home network system constructed by the server device and the client device connected to the same communication line and the same power supply line within a home, etc., the server device generates the server clock signal on the basis of a power source frequency obtained from the power supply line. The client device generates the client clock signal synchronized with the server clock signal on the basis of the power source frequency obtained from the power supply line and the data amount accumulated in the buffer of the decoder, and decodes the audio information or the video information on the basis of this client clock signal. Therefore, the client clock signal of the client device can be also synchronized with the server clock signal of the server device in the data transmission of a variable bit rate without having any influence of a change and a delay of the transmission time of data caused on the communication line.

What is claimed is:

1. A network system comprising a server device for transmitting audio information or video information and a client device for receiving the audio information or the video information transmitted from said server device, wherein said server device counts the number of clock pulses of a server clock signal used to encode the audio information or the video information on the basis of a power source synchronous pulse signal synchronized with the power source frequency of electric power supplied to the server device, and outputs information showing the counted clock pulse number to the client device; and said client device receives the information showing the clock pulse number transmitted from said server device, and counts the number of clock pulses of a client clock signal used to decode the audio information or the video information on the basis of a power source synchronous pulse signal synchronized with the power source frequency of electric power supplied to the client device, and the frequency of said client clock signal is conformed to the frequency of said server clock signal on the basis of the difference between the clock pulse number received from said server device and the counted clock pulse number.

2. A network system comprising a server device for transmitting audio information or video information and a client device for receiving the audio information or the video information transmitted from said server device, wherein said server device has server clock signal generating means for generating a server clock signal, encoding means for encoding the audio information or the video information on the basis of said server clock signal, server binarizing means for generating a power source synchronous pulse signal synchronized with the power source frequency of electric power supplied to the server device, server clock counting means for counting the number of clock pulses of said server clock signal every integer times of one period of the power source synchronous pulse signal outputted by said server binarizing means, and transmitting means for outputting the audio information or the video information encoded by said encoding means and information showing the clock pulse number counted by said server clock counting means; and said client device has receiving means for receiving the audio information or the video information transmitted from said server device and the information showing the clock pulse number, client clock generating means for generating a client clock signal, decoding means for decoding the audio information or the video information received by said receiving means on the basis of said client clock signal, client binarizing means for generating a power source synchronous pulse signal synchronized with the power source frequency of electric power supplied to said client device, client clock counting means for counting the number of clock pulses of said client clock signal every integer times of one period of the power source synchronous pulse signal outputted by said client binarizing means, and clock difference calculating means for calculating the difference between the clock pulse number received from said server device and the clock pulse number counted by said client clock counting means; and said client clock generating means conforms the frequency of said client clock signal to the frequency of said server clock signal on the basis of the difference in the clock pulse number calculated by said clock difference calculating means.

3. A network system comprising a server device for transmitting audio information or video information and a client device for receiving the audio information or the video information transmitted from said server device, wherein said server device has server clock signal generating means for generating a server clock signal, encoding means for encoding the audio information or the video information on the basis of said server clock signal, server binarizing means for generating a power source synchronous pulse signal synchronized with the power source frequency of electric power supplied to the server device, server clock counting means for counting the number of clock pulses of said server clock signal every integer times of one period of the power source synchronous pulse signal outputted by said server binarizing means, and transmitting means for outputting the audio information or the video information encoded by said encoding means and information showing the clock pulse number counted by said server clock counting means; and said client device has receiving means for receiving the audio information or the video information transmitted from said server device and the information showing the clock pulse number, decoding means having a buffer for storing the audio information or the video information received by said receiving means, and reading the audio information or the video information stored to this buffer, and decoding the read information on the basis of a client clock signal, client binarizing means for generating a power source synchronous pulse signal synchronized with the power source frequency of electric power supplied to said client device, client clock counting means for counting the number of clock pulses of said client clock signal every integer times of one period of the power source synchronous pulse signal outputted by said client binarizing means, clock counting value correcting means for correcting the clock pulse number counted by said client clock counting means on the basis of the amount of data accumulated in said buffer, clock difference calculating means for calculating the difference between the clock pulse number received by said receiving means and the clock pulse number corrected by said clock counting value correcting means, and client clock signal generating means for outputting the client clock signal conformed to the frequency of said server clock signal to said decoding means on the basis of the difference in the clock pulse number calculated by the clock difference calculating means.

* * * * *